United States Patent
Sun et al.

(10) Patent No.: US 9,702,999 B2
(45) Date of Patent: Jul. 11, 2017

(54) SYSTEM AND METHOD FOR VELOCITY ANALYSIS IN THE PRESENCE OF CRITICAL REFLECTIONS

(71) Applicants: Yonghe J. Sun, Cypress, TX (US); Yue Wang, Sugar Land, TX (US); Jianlei Liu, Katy, TX (US); Leonard Lin Zhang, Sugar Land, TX (US)

(72) Inventors: Yonghe J. Sun, Cypress, TX (US); Yue Wang, Sugar Land, TX (US); Jianlei Liu, Katy, TX (US); Leonard Lin Zhang, Sugar Land, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 383 days.

(21) Appl. No.: 14/516,975

(22) Filed: Oct. 17, 2014

(65) Prior Publication Data

US 2016/0109592 A1    Apr. 21, 2016

(51) Int. Cl.
G01V 1/28  (2006.01)
G01V 1/30  (2006.01)
G01V 1/36  (2006.01)

(52) U.S. Cl.
CPC .............. *G01V 1/303* (2013.01); *G01V 1/368* (2013.01); *G01V 1/282* (2013.01)

(58) Field of Classification Search
CPC . G01V 1/28; G01V 1/282; G01V 1/30; G01V 1/303
(Continued)

(56) References Cited

U.S. PATENT DOCUMENTS 5,189,643 A    2/1993  Wang et al.
6,081,482 A    6/2000  Bevc
(Continued)

FOREIGN PATENT DOCUMENTS

WO    2012146893    11/2012

OTHER PUBLICATIONS

Yunfeng Li, et al., "Determination of Salt Exit Velocity and its Application in Subsalt Exploration" Sociedade Brasileira de Geofisica, pp. 1-4, 2011.
(Continued)

*Primary Examiner* — Ian J Lobo
(74) *Attorney, Agent, or Firm* — Marie L. Clapp

(57) ABSTRACT

A method is described for processing residual moveout in seismic image data gathers representing critical reflections. The method includes receiving seismic image data arranged as a function of an angle or offset parameter including a high-velocity-contrast event with post-critical. The method also includes applying a wavelet de-stretch filter to the seismic data to correct wavelet stretching. The method also includes applying a fan-filter to remove coherent noise in the one or more post-critical traces; picking residual moveout of the high-velocity-contrast event; adjacent-trace differencing to detect the impact of phase change at critical reflections in residual moveouts, and applying a median-filter to the residual moveout to reduce the impact of phase change of the high-velocity-contrast event in the one or more post-critical traces. The median-filtered and reconstructed residual moveout is used for improving a velocity model used for generating the seismic image gathers.

5 Claims, 9 Drawing Sheets

(58) Field of Classification Search
USPC .......................................................... 367/73
See application file for complete search history.

(56) References Cited

U.S. PATENT DOCUMENTS

| | | | |
|---|---|---|---|
| 6,546,339 | B2 | 4/2003 | Bevc et al. |
| 6,839,658 | B2 | 1/2005 | Causse et al. |
| 7,373,252 | B2 | 5/2008 | Sherrill et al. |
| 7,480,206 | B2 | 1/2009 | Hill |
| 7,751,279 | B2 | 7/2010 | Zhao et al. |
| 8,120,991 | B2 | 2/2012 | Koren et al. |
| 8,203,907 | B2 | 6/2012 | Krebs et al. |
| 8,289,809 | B2 | 10/2012 | Winbow |
| 8,395,967 | B2 | 3/2013 | Lou et al. |
| 8,472,674 | B2 | 6/2013 | Yevskyy et al. |
| 2011/0131020 | A1 | 6/2011 | Meng |
| 2011/0213556 | A1 | 9/2011 | Yu et al. |
| 2011/0228638 | A1 | 9/2011 | Roberts et al. |
| 2011/0320180 | A1 | 12/2011 | Al-Saleh |
| 2012/0265445 | A1 | 10/2012 | Zhang et al. |
| 2013/0155814 | A1* | 6/2013 | Cao .................. G01V 1/345 367/70 |
| 2014/0307928 | A1* | 10/2014 | Jing .................. G01V 1/301 382/109 |

OTHER PUBLICATIONS

Bin Wang, et al., "Advances in velocity model-building technology for subsalt imaging" TGS, Houston,Texas, Geophysics, vol. 73, No. 5, pp. 173-181, Sep.-Oct. 2008.

O. Zdraveva, et al., "Tomography with Geological Constraints—An Alternative Solution for Resolving of Crabonates", $75^{th}$ EAGE Conference, London, UK, pp. 1-5, Jun. 2013.

Y. He, et al., "Practical Aspects of Subsalt Tomography Using Reverse Time Migration Based Angle Gathers", $74^{th}$ EAGE Conference, Copenhagen, Denmark, pp. 1-5, Jun. 2012.

Jacques P. Leveille, et al., "Subsalt imaging for exploration, production, and development: A review", Houston, Texas, USA Geophysics, vol. 76, No. 5, pp. 3-19, Sep.-Oct. 2011.

Sheng Xu, et al., "3D angle gathers from reverse time migration", Houston, Texas, U.S.A.,Geophysics, vol. 76, No. 2, pp. 77-92, Mar.-Apr. 2011.

Biondo Biondi, et al., "Angle-domain common-image gathers for migration velocity analysis by wavefield continuation imaging", Stanford, California, Geophysics, vol. 69, No. 5, pp. 1283-1298, Sep.-Oct. 2004.

Vincent Prieux, et al., "Building starting models for full waveform inversion from ide-aperture data by stereotomography" Geoazur, Universite' Nice-Sophia Antipolis, CNRS, IRD, Observatoire de la Cote d'Azur, Valbonne, France, Geophysical Prospecting, pp. 1-29, Feb. 2012.

Sheriff, et al., "Exploration Seismology", $2^{nd}$ ed. Cambridge University Press, pp. 290-303, 1995.

PCT International Search Report and Written Opinion, International App. No. PCT/US2015/021230 dated May 11, 2015.

PCT International Preliminary Report on Patentability, International App. No. PCT/US2015/021230 dated Apr. 27, 2017, 7 pages.

* cited by examiner

SYSTEM AND METHOD FOR VELOCITY ANALYSIS IN THE PRESENCE OF CRITICAL REFLECTIONS

TECHNICAL FIELD

The disclosed embodiments relate generally to techniques for using seismic data to build velocity models for geological media, where the seismic data includes events that contain critical reflections that can occur at high-velocity-contrast rock boundaries in the Earth's subsurface.

BACKGROUND

Seismic exploration involves surveying subterranean geological media for hydrocarbon deposits. A survey typically involves deploying seismic sources and seismic sensors (receivers) at accessible locations such as sea water, ocean bottom, or land surface. The sources generate seismic waves, or vibrations in the earth's subsurface, which propagate into the geological medium. Variations in physical properties of the geological media affect the propagations of the seismic waves, changing their speed and direction of propagation, focusing, defocusing, spreading, scattering, refracting, reflecting, and other alterations.

Portions of the seismic waves reach the seismic sensors largely due to reflections at rock boundaries with sharp seismic propagation velocity and/or density changes. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data.

For example, when a seismic wave is incident upon a boundary between two adjacent layers of rock, a portion of the incident seismic wave may be reflected if there is a change in medium properties such as density or wave propagation velocity (hereinafter "velocity") between the two adjacent layers. A portion of the seismic wave may also be refracted or transmitted into the adjacent medium. The amplitude of the reflection depends on the angle of incidence θ. Moreover, a difference in velocity between adjacent layers may give rise to a so-called "critical angle" beyond which no wave of a given mode will be transmitted into the adjacent medium. According to Snell's law, the critical angle $\theta_c$ is related to the velocities of the two layers by the following equation:

$$\sin\theta_c = \frac{v_1}{v_2}, \quad (1)$$

where $v_1$ is a velocity of the layer (the first medium) with the incident and reflected waves; $v_2$ is a velocity of the layer (the adjacent second medium). As the incidence angle increases from pre-critical to post-critical, the wave is no longer transmitted into the second medium, and the reflected wave exhibits a sharp phase transition versus incidence angle. The critical reflections are also accompanied by creation of head-waves or diving waves that propagate along the interface and refract back into the first medium.

Seismic exploration requires imaging of the subsurface using the seismic data. Seismic imaging requires an accurate velocity model of the geological medium. One type of seismic imaging is called seismic migration. One method for obtaining the velocity model for migration is called migration velocity analysis (MVA). Migration velocity analysis is often done iteratively, starting with an imperfect velocity model, and is often performed by a process called tomographic inversion. A symptom of the imperfect velocity is that the same subsurface reflector will be imaged at slightly different depth (mis-alignment of the image) with different source-receiver distance (e.g. offset) or incidence angle. Images at the same surface location with different offsets or incidence angles are called a common-image gather (CIG). One gather usually refers to single x-y location on the Earth's surface, but a trace of depth positions. The above mentioned mis-alignment, sometimes called residual moveout, can be picked and used as input for migration velocity analysis to improve the migration velocity model. Oftentimes the residual moveout is a smoothly varying curve with offset or angle. However, critical reflections give rise to a litany of problems, discussed in greater detail below. These problems, among others, make residual moveout picking for tomographic inversion of seismic data difficult. The conventional approach to dealing with data containing critical reflections is to remove (i.e. mute) those data from the imaging gathers that correspond to the near-critical and post-critical reflections. The removed data, however, may be valuable for creating high-resolution and high-velocity-contrast velocity models. As can be seen from Eq. (1), as the ratio in velocity between the first layer and the second layer gets larger, the critical angle decreases. Thus, at high-velocity-contrast boundaries (e.g., between sediment and salt), conventional approaches must mute data starting at a relatively small offset or angle, and therefore may not have sufficient offset range for detecting the residual moveout for adequate velocity analysis. For sediment-salt boundaries, the conventional approach has been to mute out entire top-of-salt reflections, not just the post-critical part of the reflections. This prevents the velocity analysis immediately above and near the top of salt, especially in regions lacking coherent reflectors immediately above salt.

SUMMARY

Accordingly, there is a need for methods of dealing with the problems presented by critical reflections, so that velocity analysis (e.g., a tomographic inversion) can be performed using seismic data that includes data corresponding to critical and post-critical reflections.

In accordance with some embodiments, a method is performed at a computer system with one or more processors and memory. The method includes receiving seismic data common-imaging gathers (CIGs). The gathers can include high-velocity-contrast reflection events. The image traces within a CIG are usually arranged in order of an offset, incidence-angle (or just angle), or another gathering parameter. A high-velocity-contrast event may include one or more post-critical traces whose respective angle or offset parameters are greater than a critical angle or offset of the high-velocity-contrast event. The method further includes applying a wavelet de-stretch operation to the seismic data gather. The wavelet de-stretch corrects the wavelet stretching induced by migration. The method further includes applying a fan-filter to the seismic data gather to remove the refracted data (e.g. head-waves) accompanying the high-velocity-contrast post-critical event in the one or more traces or depths, and picking residual moveout of the reflection event. The fan filter also attenuates converted waves, residual multiples, and other noise. The method still further includes differencing the residual moveout picks between every pair of adjacent offsets/angles of each CIG, applying a median-filter to the differenced residual moveout in offsets, and integrating (i.e, reverse differencing) to rebuild the now-filtered residual moveouts. The differencing is to detect the abnormally high residual moveout gradient versus offset (or angle) due to sharp phase changes near the critical angles. The median filter is to remove the abnormally high gradient. The integration is to reconstruct the residual moveout picks after the effects of rapid phase change associated with critical reflections have been reduced. The reconstructed residual moveout is now suitable for use in tomographic inversion to obtain improved velocity model for seismic imaging.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of dealing with critical reflections in seismic data. In doing so, the methods, systems, and computer readable storage medium can be used to improve velocity models for subterranean volumes of interest, and thus improve imaging of the subterranean volumes of interest.

Seismic imaging (e.g. migration) requires a reasonably accurate velocity model. Some methods for obtaining a velocity model analyze what remains of the moveout and/or residual moveout of seismic gathers as a way to improve the velocity model. For example, migration velocity analysis (MVA) is a process of estimating velocities in the image domain by performing several iterations of the following three-step process: (1) one or more seismic input data are migrated using the current best estimate of the velocity model (e.g., the initial velocity model or a previous iteration of the velocity model); (2) the pre-stack image gathers are analyzed for residual moveouts (diagnostic of velocity errors); and (3) the measured residual moveouts are inverted into an updated velocity model.

Figure 1:
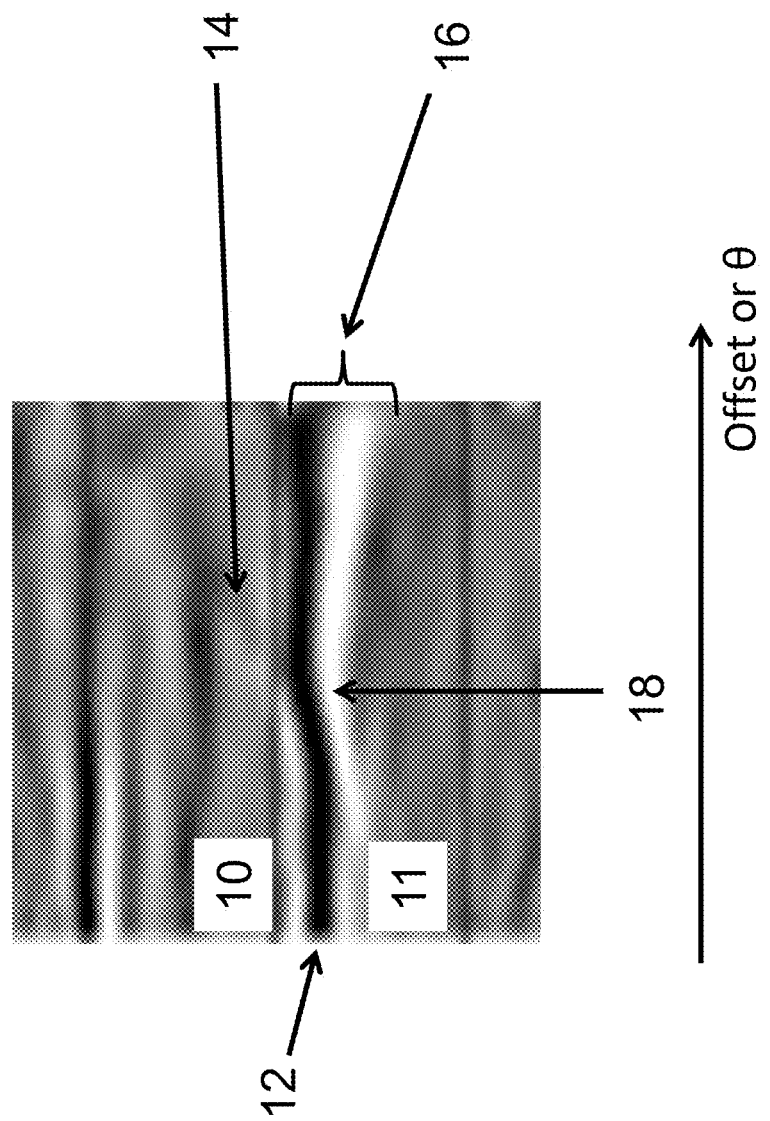
FIG. 1 is an example of a seismic gather including traces with critical and post-critical reflections and wavelet stretching (data used in generating the pictures in this and other figures is courtesy of Schlumberger Multiclient)

However, when critical reflections are present in seismic input data, the output image suffers from artifacts that make the image gathers unsuitable for residual moveout analysis and, thus, unsuitable for techniques such as MVA. FIG. 1 illustrates a simple example of a seismic image gather that includes migration of seismic traces beyond the critical angle. The seismic event 12 extends along the angle ($\theta$) or offset axis. This seismic event 12 represents the interface between a low-velocity medium 10 above the interface and a high-velocity medium 11 below the interface. The event appears as a wavelet on each trace. This wavelet remains fairly consistent in amplitude and phase until it reaches the critical angle $\theta_C$ 18. The wavelet then changes on each trace beyond the critical angle $\theta_C$ 18. The most notable changes are in the phase of the wavelet near the critical angle and the wavelet stretching 16 with increasing angle or offset. In addition, as explained above, a head wave 14 (or diving wave) may also accompany the critical angle. The head wave complicates the residual moveout picking by intersecting events of interest while the phase change and wavelet stretch make individual events complicated for picking.

Figure 2:
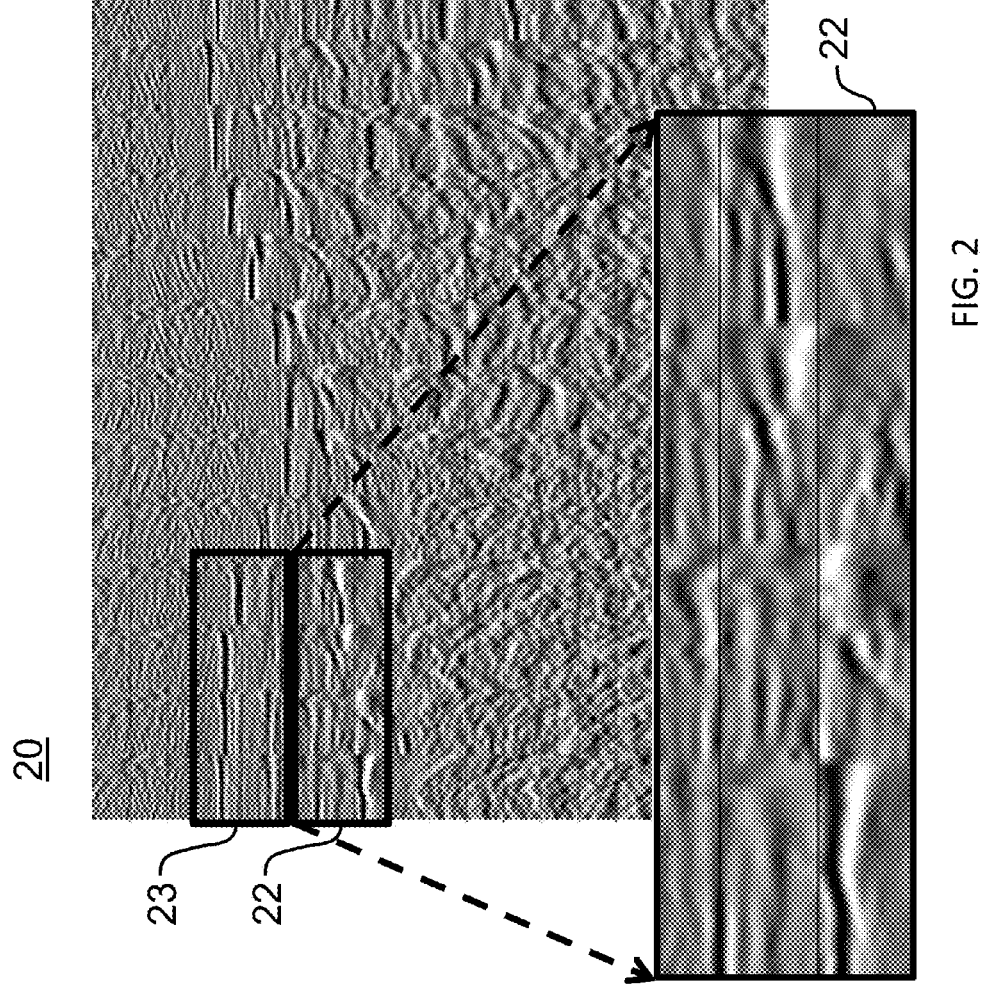
FIG. 2 is another example of seismic gathers.

FIG. 2 is an example of image gathers from prestack depth migration of recorded seismic data. There are eighteen common image point (CIP) gathers shown in panel 20, each from a geographic location along a line over a subsurface volume of interest, including a salt body and sediments/rock layers. The CIP gathers on the left side of panel 20 represent seismic energy that has encountered the salt body at shallower depth than ones on right side. The salt has much higher velocity than the overburden sediment and rock. The water bottom event and a shallow sediment event can be seen in the box 23 which includes four of the seismic gathers of panel 20. The seismic event representing the salt top, which is a high-velocity-contrast event, is seen in the four gathers included in box 22, which is indicated in both panel 20 and as a larger version below. The seismic events in box 23 are substantially flat with consistent wavelets across each of the gathers and do not suffer from artifacts created by a critical angle. There is some wavelet stretch at the largest (rightmost) offsets. In box 22, however, the seismic event corresponding to the sediment-salt is quite distorted by the presence of the critical angle. Conventional practice will mute (set to zero amplitude) the seismic event beyond the critical angle, or even completely remove the high-velocity-contrast event (e.g. muting the top-of-salt event). Removing this data makes residual moveout analysis impossible in that area immediately above the top of salt so the velocity model cannot be refined there.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Figure 3:
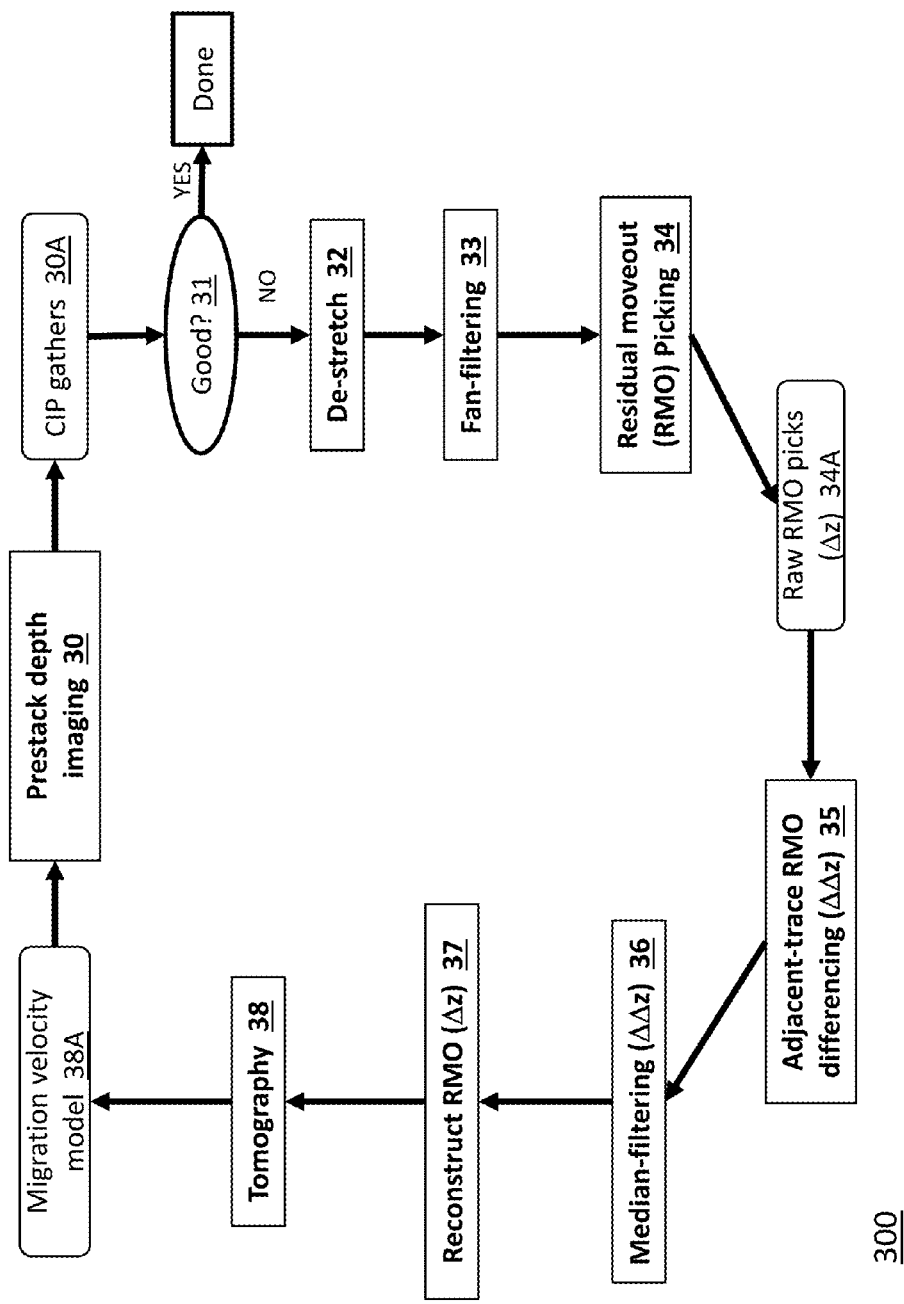
FIG. 3 is a flowchart illustrating an embodiment of the present invention.

FIG. 3 illustrates a flowchart of an embodiment of the present invention. Operations performed as part of the method 300 are in boxes with right-angle corners; intermediate data products are in boxes with rounded corners and labeled with a suffix "A". As indicated by the arrows, this process may be iterative.

An initial velocity model is used to perform prestack depth migration 30. The prestack depth migration 30 produces common image point (CIP) gathers 30A in depth. These CIP gathers may contain one or more high-velocity-contrast events. The CIP gathers 30A can be evaluated to determine if the result of the prestack depth migration 30 is good at decision point 31. This evaluation may be based on the flatness of the events in the CIP gathers 30A as well as the focusing of the events as seen in the CIP gathers 30A, the common-offset image sections, common-angle image sections, or stacked sections. In some instances, it is likely that there may be a target volume of interest which is where the evaluation is focused. If the result of the prestack depth migration 30 is good enough, the process can end. However, if the result is not good enough, the process will continue in an attempt to use the data that can include the high-velocity-contrast events to improve the velocity model.

The next operation is de-stretch 32. The example in FIG. 1 demonstrated the wavelet stretch 16 common in CIP gathers after prestack depth migration. Those of skill in the art are familiar with de-stretch filters. In some embodiments, the wavelet de-stretch filter is applied to individual traces, and applying the wavelet de-stretch filter includes transforming the individual traces into the time-frequency domain (e.g., using a one-dimensional (1D) Fourier transform within time windows) and shifting the frequency spectra to higher frequencies. In general, the stretch is more severe at larger reflection angles, thus requiring more shift. Many variations of wavelet de-stretch filtering may be performed, in accordance with a wide variety of embodiments. Some of these techniques, known more generally as "wavelet processing techniques," are described in greater detail, for example, in Sheriff, Robert E., Geldart, Lloyd P., *Exploration Seismology*, pp. 290-300, Second Edition, Cambridge: Cambridge University Press, 1995. In any event, the wavelet de-stretch filter corrects the wavelet stretching.

Referring again to FIG. 3, the next operation is fan-filtering 33. In some embodiments, the fan-filter is applied to multiple traces of a prestack image gather to attenuate head waves. In some embodiments, the fan-filter also removes other types of unwanted data, such as other non-primary arrivals (e.g., P-S converted arrivals). In some embodiments, applying the fan-filter includes applying a Fourier transform to convert the seismic data gather from an initial domain (e.g., a time-angle or time-offset domain) to a frequency/wave-number (f-k) domain. For example, in some embodiments, the fan-filter is applied collectively to a collection (e.g., plurality) of traces, and applying the fan-filter includes transforming the collection of traces into a two-dimensional frequency domain, for example, into an f-k domain, which stands for temporal frequency and wavenumber, using a two-dimensional (2D) Fourier transform. In some embodiments, applying the fan-filter includes, prior to transforming the collection of traces into the f-k domain, converting the seismic data gather from an arrangement by angle or offset parameter to an arrangement by spatial offset parameter, such that the Fourier transform results in information as a function of spatial wavenumber k, having units of inverse length. Regardless, the result is a two-dimensional (2D) spectrum in the f-k domain.

The 2D Fourier transform is performed because, in some embodiments, head waves, converted waves, and other coherent noise have different moveout slopes from those of the events of interest and they are separated to a further extent in the f-k domain than in the time-angle or time-offset domain. Thus, it is easier to "tease out" the unwanted data from the desired data in the f-k domain. In some embodiments, applying the fan-filter includes applying the fan-filter to the seismic data gather in the f-k domain, where the fan-filter is a two-dimensional (2D) filter in the f-k domain. For example, in some embodiments, applying the fan-filter includes setting a predefined region (e.g., a fan-shaped region in the f-k domain) of the spectrum to zero. In some embodiments, applying the fan-filter includes applying a predefined function to "mute" a predefined region (e.g., a fan-shaped region in the f-k domain). For example, in some embodiments, the predefined function smoothly varies to zero within the fan-shaped region, so as not to introduce artifacts by having sharp variations in the two-dimensional spectrum, which will appear as "ringing" in the data when back-transformed into the original domain of the seismic data gather (e.g., the time/angular offset domain). After the fan-filter has been applied in the f-k domain, the filtered seismic data gather may be back-transformed into the original domain.

The de-stretch 32 and fan-filtering 33 operations help to improve event separation and to attenuate the noise (e.g. wavelet stretch, head waves, converted waves) in the CIP gathers. However, another problem is that critical reflections exhibit a sharp rise (e.g., kink, step, or bias) in the apparent moveout due rapid phase change at the critical angle, which inversion techniques (e.g., MVA) cannot distinguish from actual residual moveout due to velocity errors. Further, the kink, or bias, due to the phase change will result in the traces adding destructively when they are stacked. This is demonstrated by the high-velocity-contrast event seen in FIG. 4A. This high-velocity-contrast event represents an intermediate product after the de-stretch and fan-filter operations. The traces on the left are in the pre-critical angle region 40. The solid line under the event in this region shows that the event is substantially flat. When the event reaches critical angle region 41, the event appears to rise rapidly as indicated by the dotted line. In the post-critical angle region 42, the event continues a gentle slope, as indicated by the dash-dot-dash line.

Figure 4A:
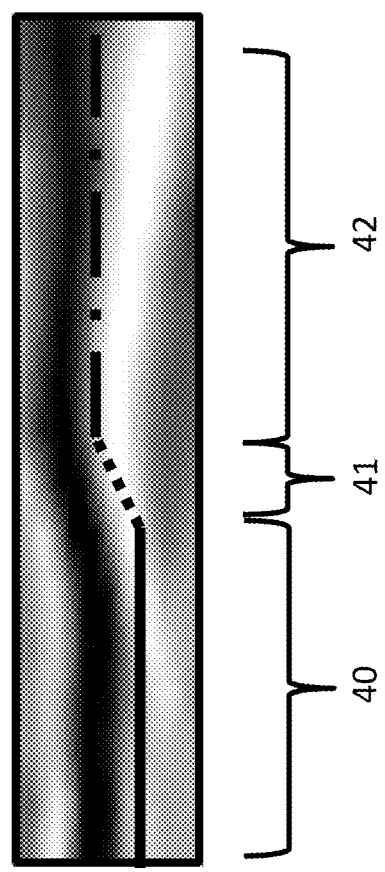
FIG. 4A is a nearly flattened seismic gather including post-critical angle traces.
Figure 4B:
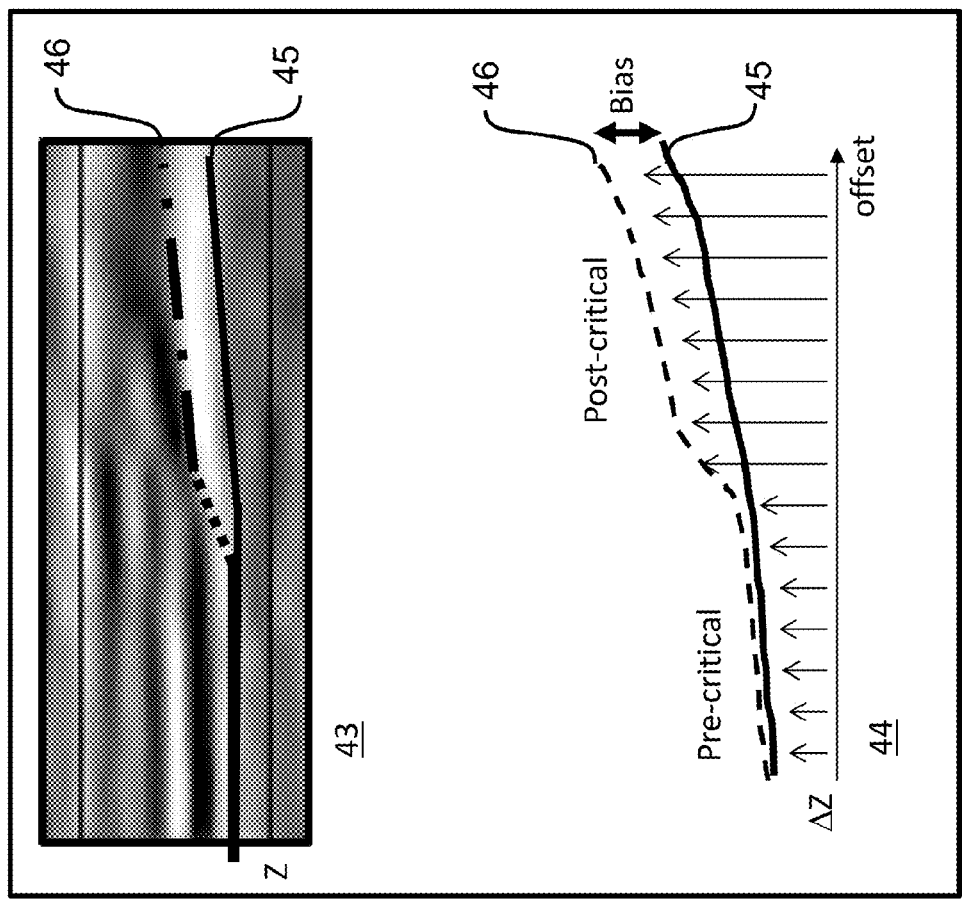
FIG. 4B is a diagram of aspects of the seismic gather as in FIG. 4A, but with residual moveout versus offset.

Referring again to FIG. 3, after the preparatory processes the CIP gathers are subjected to residual moveout (RMO) picking. Those skilled in the art are aware that RMO picking may be done by many methods, including manual, automatic, and semi-automatic picking computer software. This is demonstrated, for example, in FIG. 4B. The high-velocity-contrast event shown in gather 43 in FIG. 4B is generated by the same top of salt as the one shown in FIG. 4A, but with more residual moveout. Gather 43 is the rightmost gather and the gather in FIG. 4A is the leftmost gather in box 22 of FIG. 2. On gather 43, the solid line represents a desired residual moveout curve 45 (nearly flat for nearly correct velocity); this curve would actually not be picked by RMO picking 34 for this seismic event but is displayed for comparison purposes. The dashed and dot-dashed line would be generated by RMO picking 34 by following peak, trough, or zero-crossing residual to create moveout curve 46. These curves are also shown on graph 44, where the vertical axis is $\Delta z$, the difference in depth as compared to a horizontal (completely flat) line, which is a measure of residual moveout with usually hyperbolic shape from near to mid-offsets. The plurality of vertical arrows represents RMO picks of the event on individual traces from some reference depth chosen to represent the depth of the overall event in the gather. The residual moveout curve 46 is a curve of the raw RMO picks 34A of FIG. 3. As explained previously, the residual moveout curve 46 is "kinked" due to passing through the critical angle and is not suitable for conventional velocity analysis because the kink would translate into non-zero velocity change even when the migration velocity is correct. The difference between the residual moveout curve 46 tracking the phase of the critical reflections and the desired residual moveout curve 45 measuring the effect of incorrect velocity is labeled as the bias. Conventional velocity analysis (e.g. MVA) by tomography is designed to handle residual moveout curves like desired residual moveout curve 45. The present invention is capable of removing the kink from the residual moveout curve 46 in the presence of critical reflections so that it more closely captures a residual moveout curve that measures the errors in the migration velocity, allowing the use of this data for improving the velocity model.

Figure 5:
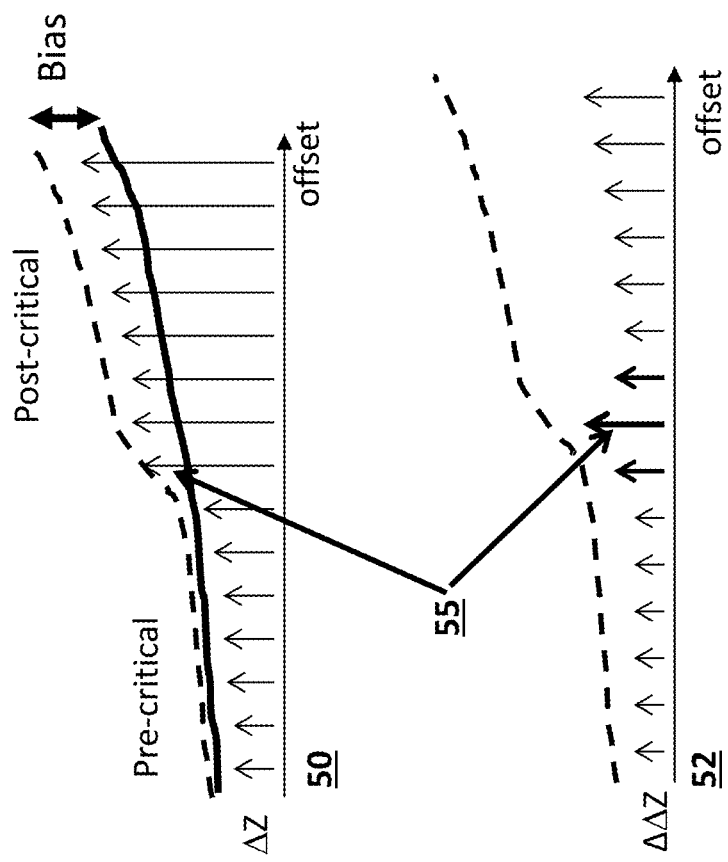
FIG. 5 is a diagram of one step of the present invention.

Referring again to FIG. 3, once the raw RMO picks 34A are obtained, the process continues to differencing the adjacent-trace RMO picks 35 to get the gradient of the RMO picks with offset. In this operation, the RMO picks, measured in $\Delta z$, from adjacent traces are subtracted from each other to create the $\Delta\Delta z$ gradient measurements. Let $\Delta z$ of an event be indexed by offset (or angle), $\Delta z_i$, for i=1, 2, 3, ..., n, for n offsets or angles. The adjacent-tracing differencing produces n−1 differences: $\Delta\Delta z_i = \Delta z_{i+1} - \Delta z_i$, for i=1, 2, 3, ..., n−1. This is illustrated by FIG. 5. In FIG. 5, the graph of the raw RMO picks 50 is shown on top; this is the same graph as seen in FIG. 4B as graph 44. Once again, the solid line represents a desired RMO curve and the dashed line shows the high-velocity-contrast RMO curve. The pre-critical and post-critical regions are also labeled and the bias is again indicated. The graph of the gradient of the RMO picks 52 shows the adjacent-trace differenced picks in terms of the vertical arrows. The curve of the raw RMO picks is shown as the dashed line for reference purposes. The kink in the raw RMO picks shows up as a tall arrow in the differenced RMO picks. The kink and the tall arrow identify the critical angle 55.

Figure 6:
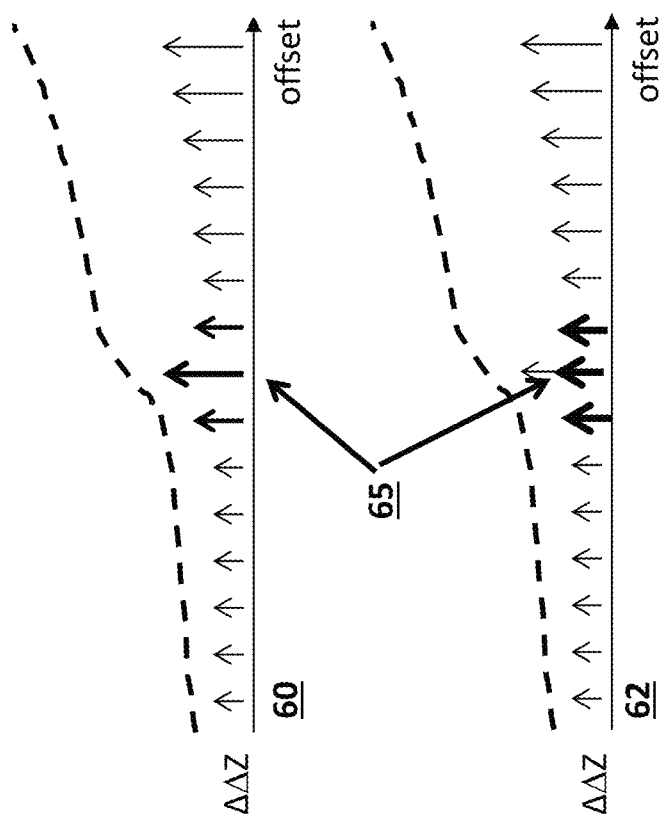
FIG. 6 is a diagram of another step of the present invention.

After differencing the adjacent-trace RMO picks, the method 300 of FIG. 3 continues to median filtering 36. Median filtering is an operation that helps to reduce or remove single points that differ largely from adjacent points. In this method, the median filtering acts to remove the large gradient of the RMO picks at the kink caused due to the presence of the critical reflection. This is illustrated in FIG. 6. The graph of the gradient of the RMO picks 60 shows the vertical arrows representing the gradient at individual points and also shows the dashed line indicating the raw RMO picks. After median filtering, the filtered gradient of the RMO picks is shown as the vertical arrows in graph 62. Once again, the dashed line in graph 62 represents the raw RMO picks. The gradient of the RMO picks at the critical angle 65 has been reduced from the tall arrow in graph 60 to match the adjacent arrows in graph 62.

Figure 7:
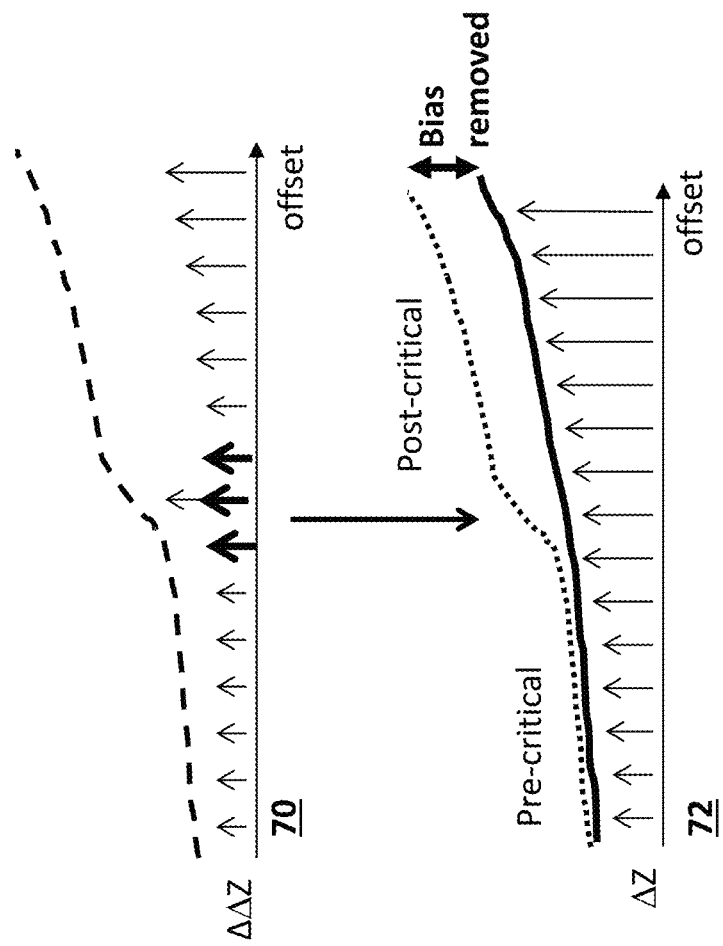
FIG. 7 is a diagram of an intermediate result of the present invention.

Referring again to method 300 of FIG. 3, the median filtering 36 prepares the gradient $\Delta\Delta z$ of the RMO picks so that the filtered gradient can be used to reconstruct the RMO ($\Delta z$) 37. The reconstruction is the reverse of the adjacent—trace differencing: $\Delta z_{i-1} = \Delta z_i + \Delta z_i$, for i=2, 3, ..., n. Here, $\Delta\Delta z_i$ are the filtered values of $\Delta\Delta z$, $\Delta z_i$ are the reconstructed values of RMO $\Delta z$ except the first trace $\Delta z_1$ which is the original value. This is demonstrated in FIG. 7. Graph 70 is the same as graph 62 of FIG. 6. After reconstruction of the RMO ($\Delta z$) 37, graph 72 shows the reconstructed RMO picks as the solid line. It is compared with the original raw RMO picks as the dotted line; the bias has been removed.

The reconstructed RMO picks do not have the phase problems (kink) that makes the RMO of high-velocity-contrast seismic events unsuitable for velocity analysis. These reconstructed RMO picks may be used as input to tomography 38. One skilled in the art will be familiar with various tomographic algorithms. Reflection ray tracing tomography is a common approach, which converts the RMO picks in depth into residuals in traveltimes. The traveltime results are then mapped into velocity correction. The mapping process is actually one that solves large linear system of equations, with each equation corresponding one reflection ray path. The linear system is usually too large to set up explicitly. The inverse problem is often solved tomographically by minimizing an objective function built from the RMO picks in the sense of least-squares using a gradient based (e.g., steepest decent or conjugate gradient) method.

The result of the tomography 38 is a migration velocity model 38A. This migration velocity model 38A should be superior to the initial velocity model that was used for the original prestack depth imaging 30. It will include information from the high-velocity-contrast events that would be lost in conventional processing. Performing the prestack depth imaging 30 again will generate new CIP gathers 30A that may be evaluated for quality. The entire process may be repeated as necessary until the CIP gathers are evaluated to be good.

Figure 8:
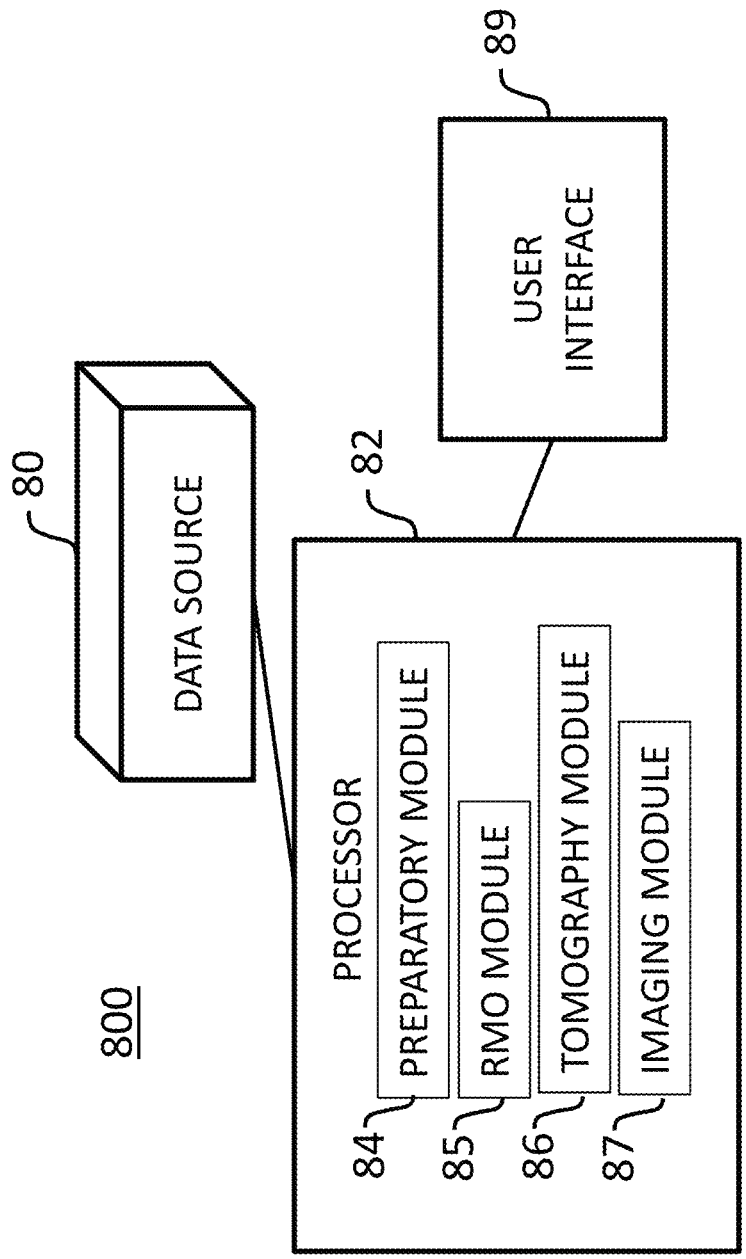
FIG. 8 is a block diagram illustrating a seismic modeling system, in accordance with some embodiments.

Method 300 may be, optionally, performed by a computer system 800 (FIG. 8). It may be governed by instructions that are stored in computer memory or a non-transitory computer readable storage medium (e.g., data storage 80 in FIG. 8) and are executed by one or more processors (e.g., processor(s) 82) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 300 is described as being performed by a computer system, although in some embodiments, various operations of method 300 are distributed across separate computer systems.

The modules executed by processor(s) 82 may include a preparatory module 84 for performing necessary noise-attenuation steps on CIP gathers prior to RMO picking. These steps may include wavelet de-stretch and/or fan-filtering. The modules may also include an RMO module 85 which may make RMO picks, calculate the gradient of the RMO picks, apply median-filtering to the RMO picks, and reconstruct the RMO picks based on the median-filtered gradient. Additionally, a tomography module 86 may use the reconstructed RMO picks as input and produce a migration velocity module that may be input to an imaging module 87. These modules may be executed repeatedly. These modules may include other functionality. In addition, other modules may be included such as a seismic interpretation module.

The system 800 may also include a user interface 89 which may be used both to display data and processed data products and to allow the user to select among options for implementing aspects of the method. By way of example and not limitation, the input seismic data and the multiple-attenuated seismic data computed on the processor 82 may be displayed on the user interface 89, stored on the data storage device or memory 80, or both displayed and stored.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of processing seismic data including traces with critical reflection events to update a velocity model, comprising:
   receiving a seismic common image gather (CIG) recorded by seismic sensors that includes a high-velocity-contrast event arranged as a function of an angle or offset parameter, wherein the high-velocity-contrast event includes one or more post-critical traces;
   applying a wavelet de-stretch filter to the seismic CIG, wherein the wavelet de-stretch filter corrects wavelet stretching;
   applying a fan-filter to the seismic CIG to remove coherent noise;
   picking residual moveout of the high-velocity-contrast event;
   comparing the residual moveout of adjacent traces to create a residual moveout difference curve;
   applying a median-filter to the residual moveout difference curve to reduce an impact of rapid phase change near critical angle of the high-velocity-contrast event to create a filtered residual moveout difference curve;
   reconstructing an updated residual moveout from the filtered residual moveout difference curve;
   updating the velocity model based on the updated residual moveout including the one or more post-critical traces; and
   performing seismic migration using the updated velocity model to generate new seismic CIG gathers.

2. The method of claim 1, wherein applying a fan-filter to the seismic CIG to remove coherent noise includes:
   applying a Fourier transform to convert the seismic CIG from an initial domain to a frequency/wave-number (f-k) domain; and
   applying the fan-filter to the seismic CIG in the f-k domain, wherein the fan-filter is a two-dimensional (2D) filter in the f-k domain.

3. A computer system, comprising:
   one or more processors;
   memory; and
   one or more programs, wherein the one or more programs are stored in the memory and configured to be executed by the one or more processors, the one or more programs including instructions that when executed by the one or more processors cause the device to:
   receive a seismic common image gather (CIG) recorded by seismic sensors that includes a high-velocity-contrast event arranged as a function of an angular offset parameter, wherein the high-velocity-contrast event includes one or more post-critical traces whose respective angular offset parameters are greater than a critical angle of the high-velocity-contrast event;
   apply a wavelet de-stretch filter to the seismic (CIG), wherein the wavelet de-stretch filter corrects wavelet stretching;
   apply a fan-filter to the seismic CIG to remove coherent noise;
   pick residual moveout of events including the high-velocity-contrast event; and
   apply a median-filter to the residual moveout to reduce the impact of phase change of the high-velocity-contrast event in the one or more post-critical traces, wherein the median-filtered residual moveout is used for improving a velocity model used for generating a new seismic CIG by seismic migration.

4. The computer system of claim 3, wherein applying a fan-filter to the seismic CIG to remove coherent noise includes:
   applying a Fourier transform to convert the seismic CIG from an initial domain to a frequency/wave-number (f-k) domain; and
   applying the fan-filter to the seismic CIG in the f-k domain, wherein the fan-filter is a two-dimensional (2D) filter in the f-k domain.

5. A non-transitory computer readable storage medium storing one or more programs, the one or more programs comprising instructions, which when executed by an electronic device with one or more processors and memory, cause the device to:
   receive a seismic common image gather (CIG) recorded by seismic sensors that includes a high-velocity-contrast event arranged as a function of an angular or offset parameter, wherein the high-velocity-contrast event includes one or more post-critical traces whose respective angle or offset parameters are greater than a critical angle of the high-velocity-contrast event;
   apply a wavelet de-stretch filter to the seismic CIG, wherein the wavelet de-stretch filter corrects wavelet;
   apply a fan-filter to the seismic CIG to remove coherent noise;
   pick residual moveout of events including the high-velocity-contrast event; and
   apply a median-filter to the residual moveout to reduce the impact of phase change of the high-velocity-contrast event in the one or more post-critical traces, wherein the median-filtered residual moveout is used for improving a velocity model used for generating a new seismic CIG by seismic migration.

* * * * *